United States Patent [19]
Hedges

[11] Patent Number: 6,132,645
[45] Date of Patent: Oct. 17, 2000

[54] ELECTRICALLY CONDUCTIVE COMPOSITIONS OF CARBON PARTICLES AND METHODS FOR THEIR PRODUCTION

[75] Inventor: Winston Lee Hedges, Livermore, Calif.

[73] Assignee: Eeonyx Corporation, Pinole, Calif.

[21] Appl. No.: 07/930,738

[22] Filed: Aug. 14, 1992

[51] Int. Cl.[7] ............................... H01B 1/04; H01B 1/12
[52] U.S. Cl. ............................ 252/510; 252/511
[58] Field of Search ............... 252/502, 510, 252/511; 106/472; 427/113; 428/364

[56] References Cited

U.S. PATENT DOCUMENTS

| | | | |
|---|---|---|---|
| 4,547,439 | 10/1985 | Genies | 429/105 |
| 4,629,540 | 12/1986 | Geniees et al. | 204/59 |
| 4,724,062 | 2/1988 | Naarmann et al. | 204/59 R |
| 4,738,757 | 4/1988 | Naarmann | 427/385.5 |
| 4,740,436 | 4/1988 | Kobayashi et al. | 429/194 |
| 4,749,451 | 6/1988 | Naarmann | 204/59 R |
| 4,772,422 | 9/1988 | Hijikata et al. | 252/511 |
| 4,798,685 | 1/1989 | Yaniger | 252/500 |
| 4,803,138 | 2/1989 | Kobayashi et al. | 429/194 |
| 4,806,271 | 2/1989 | Yaniger et al. | 252/500 |
| 4,822,638 | 4/1989 | Yaniger | 427/79 |
| 4,824,745 | 4/1989 | Ogawa et al. | 429/213 |
| 4,851,487 | 7/1989 | Yaniger et al. | 525/540 |
| 4,855,361 | 8/1989 | Yaniger et al. | 525/436 |
| 4,889,659 | 12/1989 | Genies | 252/500 |
| 4,935,163 | 6/1990 | Cameron | 252/500 |
| 4,937,060 | 6/1990 | Kathirgamanathan et al. | 428/403 |
| 4,940,517 | 7/1990 | Wei | 204/78 |
| 4,983,690 | 1/1991 | Cameron et al. | 525/436 |
| 4,986,886 | 1/1991 | Wei et al. | 204/78 |
| 4,994,783 | 2/1991 | Yaniger | 338/308 |
| 5,008,041 | 4/1991 | Cameron et al. | 252/500 |
| 5,023,149 | 6/1991 | MacDiarmid et al. | 429/27 |
| 5,069,820 | 12/1991 | Jen et al. | 252/500 |
| 5,076,920 | 12/1991 | Danowski et al. | 210/243 |
| 5,093,439 | 3/1992 | Epstein et al. | 525/540 |
| 5,160,457 | 11/1992 | Elsenbaumer | 252/500 |

FOREIGN PATENT DOCUMENTS

| | | |
|---|---|---|
| 62-064828A | 4/1987 | Japan . |
| 1022984A | 1/1989 | Japan . |
| WO 89/01694 | 2/1989 | WIPO . |

OTHER PUBLICATIONS

English Translation of Japanese Document No. J62064828A (which was transmitted to the U.S. Patent Office on Nov. 16, 1992).

*Primary Examiner*—Mark Kopec
*Attorney, Agent, or Firm*—Oppenheimer Wolff & Donnelly LLP

[57] ABSTRACT

Electrically conductive compositions of carbon nparticles having thin coatings of conductive polymer are disclosed. The thin coatings of conductive polymer electrically interact with each carbon particle and protect the carbon particles from conductive failure. Because the conductive compositions of coated carbon particles maintain their conductive characteristics even after long term exposure to chemicals, they are useful as filler materials in polymer compositions utilized to fabricate chemical delivery devices.

2 Claims, No Drawings

ELECTRICALLY CONDUCTIVE COMPOSITIONS OF CARBON PARTICLES AND METHODS FOR THEIR PRODUCTION

BACKGROUND OF THE INVENTION

1. Field of the Invention

The present invention relates to conductive carbon particles having improved performance as a filler material and improved dispersability within a matrix material. More particularly, the present invention involves compositions of carbon particles having coatings of conductive polymer which electrically and physically interact with the carbon particle to protect the carbon particle from conductive failure and provide an effective interface between the carbon particle and a matrix material, such as a polymer.

2. Description of Related Art

Carbon has found extensive utility recently in a variety of applications where its electrical conductivity, low density, low cost, and ease of processing are especially attractive. In particular, carbon in the form of particulates such as carbon black is widely used as a conductive filler material for polymers utilized to fabricate housings for electronic equipment, floor mats for electronic assembly areas, volatile chemical and fuel transport lines, conductive adhesives, electronic components and storage bins. The usefulness of carbon black in these applications is primarily attributed to its low density and its ability to dissipate accumulated static charges as well as prevent the build-up of static charges.

The static dissipation property of carbon prevents possible catastrophic explosions and/or fires which can result when charges accumulate and discharge in the form of sparks during the movement of fuels or volatile chemicals through polymeric transport lines. In the case of its utility in electronic housings, the static dissipation property prevents potentially damaging loss of data or equipment malfunction caused by discharging sparks from static charges which have built-up on the housing. Additionally, carbon filled composites can be pressed and molded to form and retain almost any shape.

Additionally carbon particulates or monolithic devices fabricated from carbon are useful in fabricating batteries and electrodes. Again, the low density and electrical conductivity of carbon makes this material attractive in applications where light weight conductive materials are preferred.

One problem associated with relying upon the conductive properties of carbon over an extended period of time relates to its highly adsorbent surface. In addition to being useful for its conductive properties, carbon is suitable for purifying and removing unwanted and especially highly colored components in liquid mixtures. Because the surface of carbon particles is a particularly good adsorbent for organic compounds, it is routinely utilized to remove soluble and insoluble organic impurities in aqueous systems. Unfortunately, this superior ability to adsorb compounds within its environment frequently results in a loss or significant reduction in the conductivity of carbon exposed to certain environments.

For example, chemical and fuel transport lines fabricated of polymers filled with carbon particles can become non-conductive as a result of the adsorption and interaction of the carbon particles with the chemical or fuel. Similarly, conductive carbon particle filled polymeric devices utilized in reactive gas or other hostile environments can lose their conductivity once exposed to the reactive gas or hostile environment for a sufficient length of time.

Conductive organic polymers have also found utility in the fabrication of devices having static-dissipation properties and in the fabrication of electrodes. Since these polymers are considerably more costly than carbon, are not structural materials and do not have the physical characteristics to be effective filler material, conductive polymers are limited in their practical static-dissipation usefulness.

In the case of their usefulness in electrochemical cells, however, conductive organic polymers have gained widespread attention. For example, conductive forms of polyaniline are widely recognized for their utility in electrochemical cells as a cathode or an anode. Additionally, in some electrochemical applications, conductive polymers are combined with carbon, to provide carbon filled polymeric composites for fabricating electrodes. The conductive polymer is the portion of the electrode which charges and discharges and is the primary functioning component of these conductive polymer/carbon electrodes. For this reason, the combination of carbon and polymer contains large amounts of polymer and relatively small amounts of carbon, the carbon being present primarily as a conductive filler material which provides strength and a substance to the mixture while maintaining the conductive nature of the polymer. Secondarily, the carbon may serve as a pathway of current flow as the conductive polymer is oxidized/reduced.

Typically, battery components of carbon and conductive polymer composites are prepared by merely mixing the conductive polymer and carbon using relatively large amounts of polymer and smaller amounts of carbon and then pelletizing the mixture into a homogeneous monolithic composite of carbon in a polymeric matrix. For example, U.S. Pat. No. 4,803,138 discloses polyaniline electrodes of pressed polyaniline powder, polytetrafluoroethylene and about 10 wt % carbon black. The amount of electrical interaction between carbon filler and conductive polymer in these composites is limited by the degree of physical intimacy between the filler and polymer obtained during the pressing operation.

Another similar application involves preparing uniform dispersions of carbon in pressed carbon electrodes. This application, disclosed in Japanese Patent Bulletin (A) 1987-64828, involves synthesizing non-conductive polyaniline in the presence of carbon to provide more uniform carbon compositions and improved mechanical strength for carbon electrodes prepared from the compositions.

Accordingly, it is an object of the present invention to provide electrically conductive compositions having improved resistance to loss of conductivity.

It is further an object of the present invention to provide electrically conductive compositions of carbon particles which maintain their physical and electrical characteristics in the presence of chemically reactive and hostile environments.

It is additionally an object of the present invention to provide electrically conductive compositions of carbon particles for use as filler material in formulations having anti-static properties.

SUMMARY OF THE INVENTION

The present invention accomplishes the above-described objectives by providing carbon particles having a thin coating of conductive polymer. The thin polymer coating provides a stable and chemically resistant protective barrier to environmentally induced changes in the surface of the carbon particles. In the absence of the thin coating of conductive polymer, these changes lead to the loss of carbon particle electrical conductivity, a characteristic that frequently forms the basis for incorporating carbon particles in, for example polymeric formulations, as filler material.

Additionally, the present invention provides methods for preparing conductive polymer coated carbon particles which result in enhanced physical and chemical interactions between the conductive polymer coating and the carbon particles. The high degree of interaction between the carbon particle and the thin conductive coating provides an effective electrical bridge to the carbon particle without reducing the physical characteristics of carbon particles which make carbon an effective filler material.

More particularly, the present invention provides electrically conductive compositions of a plurality of carbon particles each of which has a thin coating of conductive polymer in an amount sufficient to provide a coating weight of from approximately 5 wt % to approximately 50 wt % of the electrically conductive composition. While any of a number of conductive polymers is suitable for forming the coating, conductive polyaniline is preferred for its stability and its excellent conductivity.

The electrically conductive compositions of the present invention have electrical conductivities which are primarily dependent upon the size, shape, morphology and density of the carbon particles, the method selected for preparing the conductive polymer and the method of coating carbon particles, and the particular selected conductive polymer. Typically, however, the conductive compositions of the present invention have bulk conductivities of at least 0.05 S/cm which is sufficiently high for electrically conductive fillers useful in antistatic and charge dissipation applications.

An exemplary process for preparing the electrically conductive compositions of the present invention includes forming a slurry of carbon particles in a solution of the "free-base" polymer, or nonconductive form, in an organic solvent. Adding water to this slurry causes the polymer to precipitate onto the surface of the carbon particles. Then doping the polymer coating generates a conductive form of the polymer and provides carbon particles having a coating of conductive polymer. An alternative preferred method involves synthesizing the conductive polymer in a slurry of carbon particles so that the polymer is formed simultaneous with the coating process. More particularly, a predetermined amount of selected monomer is polymerized in a suitable solvent which also incorporates a slurry of deaggregated and prewetted carbon particles. As the monomer converts to polymer, the forming polymer deposits itself on the surface of the carbon particles forming a thin coating. After the polymerization process terminates, the coated particles are collected, washed and dried. The result is free-flowing electrically conductive coated carbon particles which retain their electrical conductivity even when exposed to hostile environmental conditions such as reactive gases and chemicals.

The electrically conductive compositions of coated carbon particles of the present invention are particularly useful as particulate filler material in polymer formulations used to fabricate articles having antistatic and charge dissipation properties. For example, carbon particles having a thin coating of conductive polymer are suitable for incorporating into polymeric formulations from which chemical transport lines are extruded. The resulting electrically conductive chemical transport lines have long term conductive properties and are not subject to conductive failure from exposure. The thin coating of electrically conductive polymer protects the surface of the carbon particles from the detrimental effects of exposure to chemicals and fuels and is responsible for the long term high conductivity of the coated particle.

Further objects, features and advantages of the conductive polymeric compositions of the present invention, as well as a better understanding thereof, will be afforded to those skilled in the art from a consideration of the following detailed explanation of preferred exemplary embodiments thereof.

DETAILED DESCRIPTION OF EXEMPLARY EMBODIMENTS

The present invention is based upon the discovery that the performance of carbon particles which are widely used as electrically conductive filler material for polymers can be enhanced with a thin coating of conductive polymer without losing their electrical or physical characteristics. Moreover, unlike uncoated carbon particles, the coated carbon particles of the present invention can be exposed to polymers, chemicals and fuels without adversely effecting their ability to conduct electricity. It is believed that the conductive polymer maintains the electrical integrity of the carbon while shielding the carbon surface from reacting and adsorbing chemicals and polymeric additives. In the absence of the polymeric coating, the surfaces of the carbon particles eventually become passivated and cause the conductive failure of the whole particle.

The electrically conductive coated carbon particles which are the subject of the present invention are useful in virtually all applications in which carbon filler particles have utility. Those skilled in the art will appreciate that the most advantageous applications are those in which the electrical conductivity of carbon particles is the basis for its use. These applications vary widely and include filler materials for conductive polymeric adhesives used in the electronic industry, filler for battery electrodes, and filler in materials useful for preventing potentially dangerous static charge accumulation caused by friction between materials. The ability of carbon filler material to prevent static charge build-up or to dissipate static charge makes the conductive polymer coated carbon particles of the present invention useful filler material for polymers. Furthermore, the ability of the coated carbon particle compositions of the present invention to maintain electrical conductivity following long term exposure to chemicals and polymer additives makes them particularly suitable for extended use applications include coated carbon particle filled polymers used to fabricate textile fibers, transport lines for chemicals and fuels, housings for electronic equipment and floor mats for electronic assembly areas.

Accordingly, the present invention provides electrically conductive compositions which include a plurality of carbon particles, each of which has a thin coating of conductive polymer in an amount sufficient to provide a coating weight of from approximately 5 wt % to approximately 50 wt % of the composition. The carbon particles utilized in the compositions of the present invention are preferably in the form of discrete uniformly sized particles each of which has a thin coating of conductive polymer. That is, aggregates of carbon particulates are preferably minimized and the processes described herein for producing coated carbon particles provide relatively few numbers of coated aggregates of carbon particulates. However, it is expected that a certain number of coated carbon particles will exist in the form of coated aggregates of carbon particulates. Thus, for purposes of the present invention, coated aggregates of carbon particles in which more than one discrete carbon particulate forms an aggregate which itself has a thin coating of conductive polymer are within the definition of coated carbon particles.

Additionally, unlike prior art combinations of carbon particles and conductive polymer which are in the form of polymeric composites, the compositions of the present invention are in the form of free flowing coated particles. That is, the compositions of the present invention are restricted in the amount of conductive polymer and include enough polymer to form a thin conductive coating on each carbon particle. In contrast, prior art solid composites are largely conductive polymer and include small amounts of carbon particles as filler material. The conductive polymer coatings present on the surface of the carbon particles are thin, which, as mentioned above, are approximately 5 wt % to approximately 50 wt % of the weight of the filler material. The thin conductive polymer coating formed by the methods described herein allows the coated carbon particles to retain the bulk electrical characteristics of uncoated carbon particles. As such, the coating of conductive polymer serves largely as a protective electrical interconnection between the carbon particle and its surrounding environment. Conductive polymer coatings of greater than about 50 wt % of the filler material are useful as well and thicker coatings provide increased protective properties. However, the relative cost of the coated carbon particle increases with increases in conductive polymer coating thicknesses and there is a simultaneous decrease in electrical conductivity of carbon particles with thicker coatings.

Suitable forms of carbon particles include carbon particles of varying graphitic content, size, morphology and shape. Such carbon particles are widely available from commercial sources such as Degussa Corporation and Cabot. Particle sizes can range from sub-micron particulates to fibers having diameters of up to 20 microns and aspect ratios as high as 1 to 100. Additionally the surface area of carbon particles having utility in the present invention is typically at least 200 m$^2$/gram and as high as 2000 m$^2$/gram. Those skilled in the art will appreciate that carbon particles and carbon black in particular have physical and electrical conductivity properties which are primarily determined by the structure, particle size, morphology and surface chemistry of the particle.

More particularly, carbon black particle structures can range from highly structured tree-like shapes to minimally structured rod-like shapes. Typically, the conductivity of carbon particles increases with increases in the structure of the particle from low structure to fine structure. Associated with the increase in structure is an increase in surface area which also increases conductivity. Similarly, the conductivity of highly crystalline or highly graphitic particles is higher than the conductivity of the more amorphous particles. Generally speaking, any of the above-described forms of carbon particles is suitable in the practice of the present invention and the particular choice of size, structure, and graphitic content depends upon the physical and conductivity requirements of the coated carbon particle.

It is contemplated as being within the scope of the present invention to provide compositions of a plurality of carbon particles having a coating of any of a large variety of conductive polymers. Polymers having the capability of conducting electricity are documented in the literature, having been studied extensively during the past decade. A useful review article which discusses the synthesis and physical, electrical, and chemical characteristics of a number of conductive polymers is *Conductive Polymers*, Kanatzidis, M. G., C & E News, 36–54, Dec. 3, 1990. Some of the more useful classes of conductive polymers include unsaturated or aromatic hydrocarbons as well as nitrogen, sulfur, or oxygen containing compounds. The polymers include but are not limited to conductive forms of polyacetylene, polyphenylene, polyphenylenevinylene, polypyrrole, polyisothianaphthene, polyphenylene sulfide, polythiophene, poly(3-alkylthiophene), polyazulene, polyfuran, and polyaniline. For purposes of the present invention, conductive forms of polyaniline are preferred for forming the coating of conductive polymer. These conductive forms include self-doped, sulfonated polyaniline which is conductive without external doping.

Polyaniline can occur in several general forms including a reduced form having the general formula

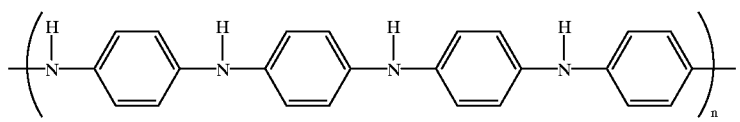

a partially oxidized form having the general formula

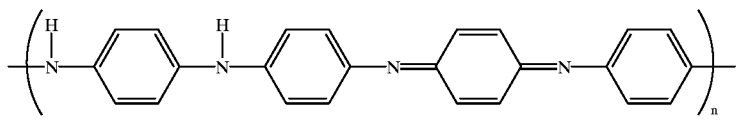

and the fully oxidized form having the general formula

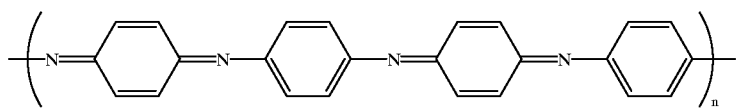

Each of the above illustrated polyaniline oxidation states can exist in its base form or in its protonated form. Typically, protonated polyaniline is formed by treating the base form with protonic acids, such as mineral and/or organic acids. The electrical properties of polyaniline vary with the oxidation states and the degree of protonation, with the base forms being generally electrically insulating and the protonated form of polyaniline being conductive. Accordingly, by treating a partially oxidized base form of polyaniline, a salt having an increased electrical conductivity of approximately 1–10 S/cm is formed.

The preparation and properties of polyaniline, both its non-conductive or "free base" form and its conductive "acid" form, are well documented in the literature. For example, U.S. Pat. Nos. 5,008,041, 4,940,517, 4,806,271, disclose methods for preparing polyaniline under a variety of conditions for obtaining different molecular weights and conductivities. Typically, polyaniline is prepared by polymerizing aniline in the presence of a protonic acid and an oxidizing agent resulting in the "acid" protonated conductive form of the polymer.

Protonic acids having utility in the synthesis of polyaniline include acids selected from the group consisting of HX, $H_2SO_4$, $H_3PO_4$, $R(COOH)_n$, $R'(COOH)_n$, $R(SO_3H)_n$, $R(PO_3H)_n$, $R'(SO_3H)_n$, $R'(PO_3H)_n$, wherein X is a halogen, R is hydrogen or substituted or unsubstituted alkyl moiety, R' is a substituted or unsubstituted aromatic moiety, and n is an integer $\geq 1$. Exemplary acids include methane sulfonic acid, benzene sulfonic acid, toluene sulfonic acid, or acids having the formula $HO_3SR'$—O—$R''SO_3H$ wherein R' and R" are independently substituted or unsubstituted aromatic moieties. Substitutions for the aromatic moieties include halogen, alkyl, or alkoxy functionalities.

As described in more detail below, in the practice of the present invention it may be preferable to prepare polyaniline with a protonic acid having the formula

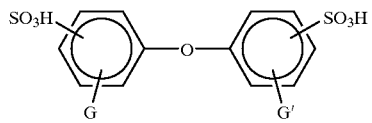

wherein G and G' are independently hydrogen, lower alkyl, octyl, nonyl, or saturated or unsaturated linear or branched decyl, dodecyl, tetradecyl, hexadecyl, or octadecyl groups. Protonic acids belonging to this general class of compounds have surfactant properties which aid in dispersing and deaggregating carbon particles. Exemplary protonic acids having surfactant properties are selected from the group consisting of decyl diphenylether disulfonic acid and decylphenylether disulfonic acid.

Generally, the counter-ion of the protonated conductive polyaniline is supplied by the protonic acid utilized in the polymerization. Accordingly, the counter-ion can be selected from a large number of ions including the anions of the aforementioned protonic acids. The nonconductive form of polyaniline can be prepared by deprotonating the doped conductive form, for example, by dissolving or slurrying the polymer in ammonium hydroxide solution, to form nonconductive polyaniline free base.

It is further contemplated as being within the scope of the present invention to utilize sulfonated polyaniline compositions having the following general formula:

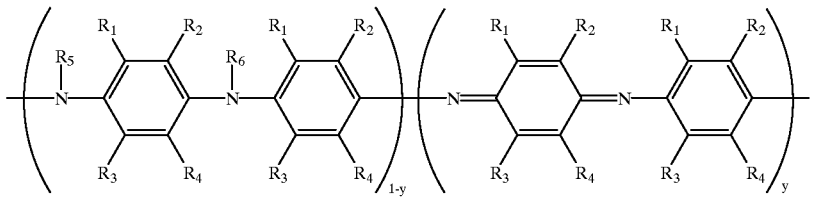

wherein $0 \leq y \leq 1$; $R_1$, $R_2$, $R_3$, $R_4$, $R_5$, $R_6$ are selected from the group consisting of H, —$SO_3$, —$SO_3H$, —$R_7SO_3$, —$R_7SO_3H$, —$OCH_3$, —$CH_3$, —$C_2H_5$, —F, —Cl, —Br, —I, —$NR_7$, —$NHCOR_7$, —OH, —O, —$SR_7$, —$OR_7$, —$OCOR_7$, —$NO_2$, —COOH, —$COOR_7$, —$COR_7$, —CHO, and —CN, wherein $R_7$, is a $C_1$–$C_8$ alkyl, aryl or arylalkyl group. Furthermore, the fraction of rings containing at least one $R_1$, $R_2$, $R_3$, or $R_4$ groups as —$SO_3$, —$SO_3H$—, $R_7SO_3$, or —$R_7SO_3H$ can be varied from a few percent to one hundred percent. The solubility of the sulfonated polyaniline is varied by changing the degree of sulfonation. In fact the solubility of polyaniline is increased in basic aqueous solution by the presence of —$SO_3H$ group on the phenyl rings. Also the oxidation state of the polymer and the degree of sulfonation can be independently varied.

The synthesis of sulfonic acid ring-substituted polyaniline, or self-doped sulfonated polyaniline, is reported in an article entitled *Synthesis of Self-Doped Conducting Polyaniline*, Yue et al., J. Am. Chem. Soc, 2800–2801, 1990 which is herein incorporated by reference. Briefly, sulfonated polyaniline is prepared by converting polyaniline to its more soluble nonconductive emeraldine base form and dissolving the base form in fuming sulfuric acid. Then, after 2 hours of constant stirring at room temperature, slowly adding the solution to methanol at a temperature of between 10° C. to 20° C. causes sulfonated polyaniline to precipitate.

It is contemplated to be within the scope of the present invention to provide methods for preparing electrically conductive compositions of coated carbon particles by forming conductive polymer in a reaction mixture which additionally includes carbon particles. The amount of carbon particles in the reaction mixture is sufficient to provide each of the carbon particles with a coating of from approximately 5 wt % to 50 wt % conductive polymer. As previously mentioned, the carbon particles are preferably in the form of discrete unaggregated particles. However, aggregates of carbon particulates are fully within the definition of carbon particles for purposes of the present invention.

In accordance with the present invention, carbon particles having a coating of conductive polymer can be prepared utilizing in situ methods by forming conductive polymer in a reaction mixture which incorporates carbon particles in an amount sufficient to provide each of the carbon particles with a coating of from approximately 5 wt % to 50 wt % conductive polymer. Then separating the conductive polymer from the reaction mixture provides an electrically conductive composition. When polyaniline is the selected conductive polymer the coating process is accomplished by forming a slurry of deaggregated and wetted carbon particles in a reaction mixture of a solution of solvent, protonic acid, aniline, and other additives such as suitable oxidants. Preferably, the reaction mixture also includes dianiline in an amount sufficient to provide the desired polyaniline molecular weight according to known polyaniline synthetic methods. As conductive polyaniline forms it coats the surface of the carbon particles, slowly precipitating a thin, adherent conductive coating. Typically the polymerization process occurs at temperatures between 0–80° C. Once collected and washed the coated particles are suitable for incorporating into a suitable resin or matrix material as filler material, forming a conductive polymeric composition.

A variety of protonic acids are suitable for forming acidic solutions and/or protonating polyaniline and include the aforementioned protonic acids useful in polyaniline synthesis and doping nonconductive polyaniline to form conductive polyaniline. Advantageously, protonic acids having surfactant properties are useful for prewetting and deaggregating carbon black. Thus, these surfactant protonic acids combine in their function as a surfactant and reactive acid in the above-described process. As previously mentioned, protonic acids belonging to this general class of compounds include decyl diphenylether disulfonic acid and decylphenylether disulfonic acid. Similarly, a variety of oxidants are suitable for incorporating into the reaction mixture and include ammonium persulfate, inorganic chlorates, inorganic chromates, and peroxides.

Alternatively, carbon particles can be coated with conductive polymer by first forming a mixture of deaggregated carbon particles in a solution of polymer and then causing the polymer to precipitate onto the carbon particle by adding water or other non solvent for the polymer to the mixture. The coated carbon particles are then suitably collected, washed and dried. Typically, when polyaniline is the polymer of choice, the solution of polymer is a solution of free-base polyaniline in its undoped form. Accordingly, following the coating step the coated particles are converted to a conductive form by generating a coating of conductive polymer. This doping step is accomplished by forming a slurry of the coated carbon particles and aqueous solution of dopant. Suitable dopants are those protonic acids already mentioned which are useful in the synthesis of polyaniline.

A preferred method for coating carbon particles with polyaniline includes first deaggregating carbon particles by stirring carbon particles in a suitable aqueous surfactant to form a slurry of carbon particles. Suitable surfactants include any of a variety of ionic and nonionic surfactants as known in the art. Preferred surfactants are those which are additionally suitable in the polymer synthesis and as dopants for the conductive polymer. These preferred surfactants include long chain alkyl substituted sulfonic acids such as those protonic acids having the formula

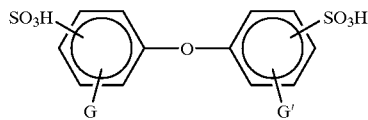

wherein G and G' are independently hydrogen, lower alkyl, octyl, nonyl, or saturated or unsaturated linear or branched decyl, dodecyl, tetradecyl, hexadecyl, or octadecyl groups. Protonic acids belonging to this general class of compounds have surfactant properties which aid in dispersing and deaggregating carbon particles. Exemplary protonic acids are selected from the group consisting of decyldiphenylether disulfonic acid and decylphenylether disulfonic acid.

Subsequent process steps include pre-wetting carbon particles in an aqueous solution of protonic acid, combining aniline and dianiline with the wetted carbon particles, cooling the slurry and adding an appropriate oxidant. The polymer forms in the presence of the carbon particles and the polymer material actually coats the carbon black as the polymer forms. During the work-up step the carbon particles are collected, washed, and dried resulting in coated carbon particles having a coating of from about 5 wt % to about 50 wt % conductive polyaniline.

An alternate method for coating carbon particles with conductive polyaniline includes dissolving soluble free base polyaniline in a suitable solvent such as N-methyl pyrrolidinone, formamide, dimethylformamide or dimethylsulfoxide, forming a slurry of carbon particles and then causing the dissolved polymer to precipitate onto the carbon particles. Typically water is added to the slurry to cause the precipitation, however, other nonsolvents for the polymer are effective for precipitating the polymer. The coated carbon particles are then dispersed in an aqueous solution of protonic acid as described above to produce the conductive acid-doped form of polyaniline.

In accordance with the present invention, when self-doped sulfonated polyaniline is the conductive polymer of choice, the preferred method for preparing coated carbon particles involves dissolving sulfonated polyaniline in an aqueous base to form a polymer solution, adding carbon particles to form a slurry and then causing the polymer to precipitate onto the surface of the carbon particles. The preferred aqueous base is aqueous ammonia or ammonium hydroxide. However, other suitable aqueous bases include aqueous solutions of metal hydroxides having the formula:

wherein M is a metal having charge n, and n is an integer ≧1;

compounds having the formula:

wherein R, R', R", R'" are independently H, alkyl, or aryl functionalities; and compounds having the formula:

wherein R, R', R" are independently H, alkyl, or aryl functionalities

Typically, precipitating the polymer is accomplished by changing the pH of the polymer solution. More particularly, the pH of the aqueous system is caused to decrease causing the polymer to precipitate. Those skilled in the art will appreciate that adding a protonic acid to the aqueous system will cause the sulfonated polyaniline to precipitate. When aqueous ammonia or a volatile amine is the aqueous base, a preferred method for changing the polymer solution pH includes heating the polymer solution. This causes the base to leave the solution with a resulting drop in pH. Exposing the polymer solution to a vacuum aids the pH lowering process by causing the volatile amine.

Alternatively, carbon particles having a coating of sulfonated polyaniline may be prepared using in situ methods similar to those discussed above. An exemplary method includes polymerizing amino-benzene sulfonic acid in 1 M HCL in the presence of a suitable oxidant and carbon black. As the polymer chain develops the polymer precipitates from solution onto the surface of the carbon black particles, forming a thin coating of conductive polymer.

In accordance with the present invention and independent of the method selected for preparing coated carbon particles, carbon particles are preferably dispersed and relatively free of aggregates. Alternatively, aggregates which are present are small enough to maintain the structural and conductive characteristics of particles. Those skilled in the art will appreciate that once provided with a thin coating of conductive polymer, carbon particles having the least amount of aggregates are less likely to shear or break into a significant number of particles having exposed uncoated portions of carbon. The coating of conductive polymer protects the particle from conductive failure and provides other physical advantages. Accordingly, uncoated portions of aggregates or particles are preferably avoided.

Suitable methods for deaggregating carbon particles include mechanical and ultrasonic dispersion techniques which are typically performed with the carbon black dispersed in aqueous systems containing a surfactant. Thus, for example, carbon particles having a coating of conductive polyaniline can be prepared by dispersing carbon particles in an aqueous solution of TRITON X-100 available from Rohm & Haas. Then, following the effective deaggregation of the carbon particles, a protonic acid, such as aqueous p-toluene sulfonic acid, aniline and/or dianiline and oxidant is charged into the dispersed carbon black mixture wherein the polymer forms and precipitates onto the carbon particles.

In a preferred method for deaggregating and coating carbon particles utilizing methods which involve in situ polymerization processes, a disulfonated alkyl diphenyl ether provides both the surfactant properties and the acidic medium for the polymerization. An exemplary surfactant in this class of compounds is n-decyldiphenyl ether disulfonic acid, available from PILOT Chemical Co. This compound has two sulfonic acid groups per molecule and at least one ten member hydrocarbon chain per molecule.

In accordance with the present invention, when coated carbon particles are prepared by polymerizing aniline in the presence of carbon particles, the coated carbon particles generally have a greater conductivity than precipitating free-base polyaniline onto carbon particles from a solution of the polymer. Moreover, when free-base polyaniline is precipitated onto carbon particles from a solution of polyaniline the conductivity of the resulting coated carbon particles is greater than the conductivity of material formed by merely combining neat conductive polyaniline and carbon particles and pressing the combination into a pellet. This phenomenon indicates that the greatest interaction between the polymer and the carbon particle occurs when the carbon is coated during the polymerization reaction. Similarly, a greater physical, chemical and electrical interaction between the conductive polymer and the carbon particle occurs when the polymer is precipitated onto the surface of carbon as compared to merely mixing conductive polymer and carbon particles.

In view of the greater physical and chemical interactions which develop between the conductive polymer coating and carbon particle formed by in situ polymerization techniques, in situ preparation methods are preferred. Additionally, when highly structured dendritic forms of carbon black are utilized, in situ polymerization techniques tend to preserve the fine tree-like structure in the final filler material. This is believed to occur because the polymer actually grows on the surface of the fine structure as opposed to being quickly adsorbed by precipitation techniques. The slow deposition of polymer during in situ polymerization coating methods results in a more orderly polymer. Since ordering in conductive polymers is directly related to increased conductivity, the in situ polymerization deposition results in a higher bulk conductivity of the carbon particles. Furthermore, the in situ polymerization methods directly provide doped conductive polyaniline coating. This is in contrast to coatings formed during solvent precipitation methods which require further doping procedures in order to regenerate the conductive form. These final doping procedures frequently do not form fully doped polymer to provide maximum conductivity for the composition.

As mentioned above, the protonated conductive form of polyaniline incorporates a counter-ion which is typically supplied by the acid utilized in the polymerization process or by the protonic acid utilized for converting the free base polyaniline to the protonated polyaniline. Connected with the choice of counter-ion of the conductive acid form is an associated conductivity of the polyaniline. However, surprisingly, the conductivity of carbon particles having a coating of conductive polyaniline does not necessarily parallel the performance of the conductive polymer alone. For example, polyaniline mesylate has a conductivity of approximately 10–20 S/cm and polyaniline tosylate has a conductivity of approximately 3 S/cm. Conversely, carbon particles having a coating of approximately 20 wt % polyaniline tosylate formed in situ during the aniline polymerization in accordance with the present invention have a conductivity of about 30 S/cm. Carbon particles having a coating of approximately 20 wt % polyaniline mesylate have a conductivity of about 24 S/cm. Thus, by selectively choosing the counter-ion associated with conductive polyaniline, it is possible to tailor the conductivity of the resulting coated carbon particle.

In accordance with the present invention the amount of conductive polymer formed on the surface of each carbon particle is preferably the minimum amount necessary to provide a thin coating. Those skilled in the art will appreciate that less conductive polymer is necessary to provide a thin coating on each particle of a relatively low surface area conductive carbon than the amount necessary to provide a thin coating on each particle of relatively high surface area carbon. In fact, the weight percent of conductive polymer to the total weight of the coated particle can vary from perhaps 5% to 50% or even higher. However, excessively thick coatings may detract from the desirable properties of the carbon. Thus, carbon particles having a surface area of about 250 $m^2$/gm (XC-72 from Cabot Corp.) demonstrate good physical properties when provided with a thin conductive polymer coating which is approximately 20% of the weight of the total particle. However, carbon particles having a surface area of about 1000 $m^2$/gm (XE-2 from Degussa Corp.) are not well coated at this percentage because of their much higher surface area. In the case of carbon particles having a surface area of 1000 $m^2$/gm a coating weight which is equivalent to the weight of the carbon particle provides adequate coverage.

Molecular surface area calculations can be performed to estimate the amount of polymer required to cover carbon particles having any given surface area. However, the results are only a guide due to the assumptions which go into the calculations. Another technique for measuring the quality of the polymer coating involves pressing a pellet of coated carbon particles after heating the coated carbon particles to 160° C. for 30 minutes. If a pellet forms by pressing at approximately 10,000 psi and the pellet is not easily destroyed by handling, then the quality of the coating is indicated as good. Pure carbon is not pelletized under these conditions.

The above-described evaluation technique is additionally useful for testing the conductive composition of the present invention for its heat stability. This is particularly important for compositions used as filler in polymers exposed to high temperature environments. For example XE-2 carbon particles having a surface area of about 1000 $m^2$/gm with a 20 wt % coating will form a pellet at room temperature. This pellet is stable to mechanical manipulation. However, if the coated carbon is heated to 160° C.–200° C. for 30 minutes and then pressed into a pellet, the pellet cracks easily and has little physical integrity. Apparently, the coating sinters at high temperatures and pools into carbon particle pores, thus reducing the amount of polymer on the exterior surfaces of the particle. However when these high surface area carbon particles are coated to a 50 wt % coating, the resulting conductive composition forms a strong pellet when subjected to the same conditions. It should be noted that even at these high coating levels the amount of conductive polymer in the composition is still substantially less than that typically used in a battery composition.

Those skilled in the art will recognize that the above described conductivity properties of coated carbon particles formed in accordance with the present invention indicate the presence of significant interactions between the conductive polymer and the carbon particles. That is, the overall conductivity of the electrically conductive compositions of the present invention is clearly a function of the combination of conductive polymer coating and the carbon particles. If presynthesized conductive polyaniline tosylate is merely mixed with carbon particles at a ratio of 20 wt % polymer and 80 wt % carbon particles the conductivity is only about 13 S/cm. This is notably less than the 30 S/cm associated with carbon particles having a coating of polyaniline tosylate formed during the actual polymerization of aniline. This is further evidence of the interaction between the conductive polymer coating and the carbon particles.

Those skilled in the art will appreciate that in addition to being dependent upon the amount and type of conductive polymer coating on the surface of the carbon particles, the conductivity of the compositions of the present invention is dependent upon the shape, size and morphology of the carbon particles. As discussed above, more highly structured graphitic carbon particles having dendritic shapes and high surface area are typically the most conductive forms. Similarly, coated carbon particles prepared from the more conductive forms of carbon particles is typically more highly conductive than filler prepared from particles having little structure and low graphitic content.

The following examples are offered as being illustrative of the principles of the present invention and not by way of limitation.

EXAMPLE 1

Carbon black was dispersed, deaggregated and coated using in situ polymerization techniques and a dispersing surfactant which is also a suitable dopant for polyaniline. The dispersing and coating procedure was as follows. A solution of 0.73 grams of dianiline in 10.6 mL acetic acid was charged into a 2 L reaction flask. Then 64 grams of XE-2 carbon black was wetted with 16 mL acetic acid followed by the addition of 370 mL of water.

After the carbon black was wetted by the acetic acid/water solution it was combined with 10.7 grams aniline and 270 mL of 1 N decyldiphenylether disulfonic acid (CALFAX 10LA—40 from PILOT Chemical Co.) and charged into the 2 L reaction flask. The mixture was agitated for 1 hour and a first sample was taken for particle size analysis. After 1.5 hours of agitation a second sample was taken. Then an ultrasonic probe was immersed in the mixture. Samples were intermittently taken for particle size analysis over a 4.5 hour period of time. During this time the average particle size remained between 0.13–0.15 microns.

Following the above described dispersing step, 25.4 grams of ammonium persulfate was added to the flask over a 20 minute period while maintaining the temperature of the flask contents at 5° C. After 20 minutes of stirring 5 grams of sodium sulfite in 25 mL of water was added to the flask. A particle size analysis of the coated carbon black before filtering the coated particles indicated that the particles had an average size of 0.41 microns. The coated particles were then collected by both filtration and centrifugation and washed with acetone through a buchner funnel filter cake. The above procedure illustrated the successful preparation of carbon particles which were dispersed and coated using the same disulfonic acid.

EXAMPLE 2

Conductive polyaniline coated carbon particles were prepared according to the following procedure. XE-2 carbon filler material was pre-wet by adding 640 grams of the carbon particles to 159 mL of acetic acid followed by the addition of 8.7 L of deionized water. The slurry of carbon particles, acetic acid and water was stirred until the carbon particles were well dispersed and wet.

In a separate reaction container equipped with an ice bath, nitrogen inlet, solids addition funnel and condenser/outlet bubbler, 7.30 grams of dianiline was dissolved in 106 mL of acetic acid. Then 2.7 L of 1 N p-toluene sulfonic acid monohydrate and 106.62 grams of aniline were added to the dianiline solution. Finally the slurry of acetic acid, water, and carbon was added to the dianiline, aniline and p-toluene sulfonic acid monohydrate solution while rinsing the slurry container with deionized water. This reaction mixture was cooled to 5° C. by maintaining an external dry ice bath between –5° C. and –10° C.

Then a total of 253.78 grams of ammonium persulfate was added gradually to the cooled reaction mixture while maintaining the reaction mixture at 5° C.–10° C. Once all the oxidant was added the reaction mixture was stirred for 20 minutes at 5° C.–10° C. After the 20 minute stirring period, a solution of 50.28 grams of sodium sulfite ($Na_2SO_3$) in 250 mL of deionized water was added to the reaction mixture and stirred for 10 minutes.

To work up and recover the conductive polyaniline coated carbon particles, the solids were retrieved from the reaction mixture by filtering the product through a buchner funnel using #2 filter paper. The resulting filter cake was rinsed with 2 L of aqueous 1.0 N p-toluene sulfonic acid solution, 2 L of deionized water, 2 L of isopropyl alcohol, and 43 L of acetone. The rinsed solid product was then dried in a vacuum oven under full vacuum at 50° C.

EXAMPLE 3

A thin coating of self-doped sulfonated polyaniline was formed onto the surface of highly dendritic carbon black particles according to the following procedure. First, 0.30 grams of sulfonated polyaniline were stirred in 3.0 mL of concentrated (28%) aqueous ammonia. After the sulfonated polyaniline was completely dissolved in the ammonia, 1.2 grams of dispersed XE-2 carbon black and 30 mL of aqueous ammonia were added to the ammonia and sulfonated polyaniline solution and stirred until the carbon black was well dispersed.

Heat was added to the carbon black, ammonia and sulfonated polyaniline system until the temperature reached 60° C.–70° C. and a vacuum was applied to the system. Thus, the ammonia was driven from the water, reducing the pH and causing the sulfonated polyaniline to precipitate onto the surface of the carbon black particles. The pH dropped to between 7 and 8.

Finally, the coated carbon black particles were collected by filtering and then washed with a solution of water, isopropyl alcohol, and acetone. The final coated carbon black was heated and oven dried to provide carbon particles having a coating of sulfonated polyaniline. A pellet weighing 0.152 grams and having a thickness of 1442 microns was prepared and its conductivity determined using a standard 4 point probe conductivity measuring technique. The measured conductivity was 23.4 S/cm.

EXAMPLE 4

In order to test the thermal stability and physical integrity of a composition of the present invention, a sample of XC-72 carbon from Cabot Corp. was coated with conductive polyaniline according to the method described in Example 1. Then a pellet was pressed from 0.2425 grams of the coated carbon in a pellet press at 9000 psi to give a disk having a thickness of 2054 microns. The conductivity of the pellet was determined to be 12.4 S/cm using a Loresta 4-point probe conductivity/resistance meter. A gram of the conductive coated carbon particles from the same batch was then heated to 160° C. in air in an oven for 30 minutes. A pellet having a thickness of 2333 microns was pressed from 0.2881 grams of this material. This pellet had good mechanical integrity and a conductivity of 12.0 S/cm as determined by the Loresta conductivity meter which corrects internally for variations in sample geometry. A third gram of the coated XC-72 carbon particles from the same batch was exposed to 180° C. for 30 minutes and then pressed to a pellet. This pellet had good mechanical integrity and a conductivity of 12.0 S/cm. A final gram of the above described conductive composition was exposed to 200° C. for 30 minutes and then pressed to a pellet at 9000 psi. This pellet had good mechanical integrity and a conductivity of 11.7 S/cm. This example demonstrates both the quality of the coating of an XC-72 particle at 20 weight percent polymer and the excellent thermal stability of the polyaniline decyldiphenylether disulfonate coated composition.

EXAMPLE 5

XE-2 carbon particles, having a surface area of 1000 $m^2/gm$ were coated with conductive polyaniline according to the method of Example 1. The resulting composition was pressed at 9000 psi to form a pellet. The conductivity of the pellet was determined to be 24.0 S/cm using a Loresta 4-point probe conductivity/resistance meter. A second gram portion of the above described composition was heated to 160° C. in air in an oven for 30 minutes. A pellet was pressed from a portion of this material after it had cooled to room temperature. The pellet had a conductivity of 21.5 S/cm but cracked during testing of the conductivity. Portions of the same coated carbon particles treated at 180° C. and 200° C., which were pressed into pellets behaved similarly.

EXAMPLE 6

XE-2 carbon particles from Degussa Corporation having a surface area of 1000 $m^2/gm$ were coated with conductive polyaniline according to the method of Example 1. However, the coating process differed from that of Example 1 in that the conductive polymer coating represented 50 weight percent of the composition. The resulting conductive composition was then treated according to the procedures outlined in Example 5. The pellet, which was formed without a heat treatment had a conductivity of 8.1 S/cm. The pellet which was formed following a 160° C. heat treatment had a conductivity of 4.5 S/cm and good mechanical integrity. Finally, the pellets which were formed following 180° C. and 200° C. treatments had good mechanical integrity and conductivities of 4.8 S/cm and 5.3 S/cm respectively. From the foregoing description it is clear that carbon particles having surface areas in the range of 1000 $m^2/gm$ are sufficiently coated with 50 wt % conductive polymer.

EXAMPLE 7

High surface area carbon particles (XE-2) were coated with conductive polyaniline according to the procedure of Example 1 except that toluene sulfonic acid was utilized instead of decyldiphenylether disulfonic acid. The resulting conductive composition has a carbon particle coating weight of 20 wt % conductive polymer. Samples of this composition were treated and formed into pellets as described in Example 5. The pellet which was formed without heat treatment had a conductivity of 19.23 S/cm. Pellets prepared from the conductive composition and exposed for 30 minutes at 160° C., 180° C., and 200° C. showed conductivities of 24.3 S/cm, 18.8 S/cm, and 22.3 S/cm respectively. However, all of the pellets prepared from the heat aged samples cracked readily. The results of these experiments demonstrate that high surface area carbon particles should be coated with larger than 20 wt % polyaniline tosylate in order to have thermal stability.

EXAMPLE 8

The following example demonstrates the utility of an acidic dopant which can also serve as a surfactant for dispersing and deaggregating carbon particles. The carbon particle deaggregation step includes preparing a solution of 0.73 grams of p-dianiline in 10.6 mL of glacial acetic acid and charging this solution into a 2000 mL round bottom flask equipped with a teflon paddle mechanical stirrer, a thermometer, and $N_2$ atmosphere. This was n-decyldiphenylether disulfonic acid solution to the round bottom flask. Then 10.7 grams of aniline were added to this solution. Then 64 grams of carbon (Black Pearl 2000, Cabot Corporation) were wetted with 16 mL of acetic acid followed by slowly adding 870 mL of water to form an aqueous carbon black slurry. This slurry was added to the 2000 mL reaction flask and rinsed in with 100 mL of deionized water. Agitation was continued under a $N_2$ blanket. After 5 days of agitation the aggregates of carbon particles had broken down to a median particle size of 0.15 microns as measured by a sedimentation type particle size analyzer.

EXAMPLE 9

The procedure of example 8 was repeated except that a 1.0 N solution of p-toluene sulfonic acid was used instead of the 1.0 N solution of n-decycldiphenylether disulfonic acid. This mixture was agitated for 14 days. After 14 days aggregates of carbon were still visible to the naked eye indicating poor dispersing ability of the p-toluene sulfonic acid as compared to the n-decyldiphenylether disulfonic acid described in Example 8. This experiment demonstrates the superior ability of n-decyldiphenylether disulfonic acid to disperse and deaggregate carbon particles.

EXAMPLE 10

An electrically conductive composition of carbon particles having a coating of sulfonated polyaniline was prepared by dissolving 0.30 grams of sulfonated polyaniline in 3 mL of 30% aqueous ammonia to give a dark blue solution. This solution was added to 1.2 grams of deaggregated XE-2 carbon particles slurried in 30 mL of 30% aqueous ammonia. This mixture was heated at 60–70° C. for 3 hours under approximately 28 inches of vacuum. The resulting slurry of carbon particles having a coating of sulfonated polyaniline was then filtered and washed with water. The water wash was slightly brown. This was followed by washes with isopropyl alcohol and acetone. These washes were clear. The carbon powder was dried overnight under vacuum at 50° C. A pellet pressed from 0.1518 grams of the powder had good mechanical integrity and a conductivity of 23.4 S/cm.

EXAMPLE 11

An electrically conductive composition of the present invention was prepared by causing presynthesized polyaniline to precipitate onto the surface of carbon particles according to the following procedure. A solution of 1.07 grams of polyaniline free-base in 10 mL of N-methylpyrrolidinone was prepared, followed by the addition of 5.35 grams of XE-2 carbon black, forming a paste. 75 mL of N-methylpyrrolidinone was added to the paste and the resulting slurry was stirred until the carbon was wetted. Then 50 mL of methanol was added dropwise to the slurry followed by 100 mL of water which was also added dropwise. At this point a small sample of the slurry was collected and allowed to settle. The supernatant was colorless indicating that the polymer had been adsorbed onto the surface of the carbon. The coated carbon particles were then filtered on a buchner funnel. The filter cake was then dispersed in 400 mL of aqueous 1.0 N p-toluene sulfonic acid with vigorous stirring for 30 minutes. This slurry was then filtered and the filter cake was washed with 1.0 N p-toluene sulfonic acid, isopropyl alcohol, and finally with acetone. The filtrate was colorless. The filter cake was broken-up, placed in a vacuum oven and dried overnight at full vacuum and 50° C. A pellet pressed from this coated powder had a conductivity of 19.7 S/cm.

One particularly surprising result of the coating of carbon particles with conductive polyaniline is that the conductive polyaniline is stabilized by the carbon with respect to loss of conductivity by thermal degradation. For instance a pellet pressed from polyaniline n-decyldiphenylether disulfonate has a room temperature conductivity of 1.2 S/cm. However, a pellet pressed from polyaniline n-decyldiphenylether disulfonate that had been heated at 160° C. in air for 30 minutes is only 0.20 S/cm. Similar treatment at 180° C. produces a conductivity of 0.19 S/cm while 200° C. gives 0.052 S/cm and 220° C. gives 0.0005 S/cm. Thus the conductivity falls substantially between 180° and 200° C. (The drop between room temperature and 160° C. is related to loss of water of hydration and not substantially to thermal degradation). However similar treatment of carbon which is coated with polyaniline n-decyldiphenylether disulfonate shows the following conductivities. At room temperature, 12.4 S/cm; at 160° C., 12.0 S/cm; at 180° C., 12.0 S/cm; at 200° C., 11.7 S/cm; and at 220° C., 7.85 S/cm. (The reading of 7.85 S/cm corresponds to the reading obtained if the coated carbon is treated with aqueous base to generate the non-conductive form of polyaniline).

Thus, with the conductive polymer coated onto carbon there is no substantial drop in conductivity until the dwell temperature reaches 220° C. This is important because the processing of plastics into which conductive polymer or conductive polymer coated carbon might be placed as filler often requires temperatures in the range of 200° C. or even higher. However the dwell times during processing are generally on the order of a few seconds to a few minutes. Thus the conductive polymer coated on carbon has a better chance of retaining its conductivity than would be expected on the basis of the thermal stability of the conductive polymer alone.

While the invention has been disclosed in this document by reference to the details of preferred embodiments and examples of the invention, it is to be understood that this disclosure is intended in an illustrative rather than in a limiting sense, as it is contemplated that modifications will readily occur to those skilled in the art, within the spirit of the invention and the scope of the claims which follow.

What is claimed is:

1. An electrically conductive carbon filler material having improved resistance to loss of conductivity in the presence of a hostile environment, said electrically conductive carbon filler material comprising:

a plurality of carbon black particles, each of said carbon black particles having a coating of intrinsically conductive polyaniline in an amount sufficient to provide a coating weight of from approximately 5 wt % to approximately 50 wt % of said electrically conductive carbon filler material, said coating being effective to retain the electrical conductivity of the uncoated carbon black particles and to protect the surfaces of said carbon black particles from the adverse effects of a hostile environment, wherein the polyaniline incorporates a protonic acid dopant, wherein the protonic acid dopant has the formula:

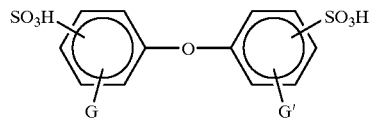

wherein G and G' are independently hydrogen, lower alkyl, octyl, nonyl, or saturated or unsaturated linear or branched decyl, dodecyl, tetradecyl, hexadecyl, or octadecyl groups.

2. An electrically conductive carbon filler material having improved resistance to loss of conductivity in the presence of a hostile environment, said electrically conductive carbon filler material comprising:

a plurality of carbon black particles, each of said carbon black particles having a coating of intrinsically conductive polyaniline in an amount sufficient to provide a coating weight of from approximately 5 wt % to approximately 50 wt % of said electrically conductive carbon filler material, said coating being effective to retain the electrical conductivity of the uncoated carbon black particles and to protect the surfaces of said carbon black particles from the adverse effects of a hostile environment, wherein the polyaniline incorporates a protonic acid dopant, wherein the protonic acid dopant is selected from the group consisting of decyl diphenylether disulfonic acid and decylphenylether disulfonic acid.

* * * * *